United States Patent
Choi (10) Patent No.: US 8,102,461 B2
(45) Date of Patent: Jan. 24, 2012

(54) MOBILE COMMUNICATION TERMINAL AND METHOD FOR DISPLAYING IMAGE USING FOCUS INFORMATION THEREOF

(75) Inventor: Young Keun Choi, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 469 days.

(21) Appl. No.: 11/881,658

(22) Filed: Jul. 27, 2007

(65) Prior Publication Data

US 2008/0239139 A1    Oct. 2, 2008

(30) Foreign Application Priority Data

Mar. 30, 2007   (KR) .................. 10-2007-0031396

(51) Int. Cl.
*H04N 5/225* (2006.01)
(52) U.S. Cl. ........................ 348/345; 348/255
(58) Field of Classification Search .................. None
See application file for complete search history.

(56) References Cited

U.S. PATENT DOCUMENTS

| 2001/0012072 | A1   | 8/2001  | Ueno |
| 2003/0071904 | A1 * | 4/2003  | Karasaki et al. ........... 348/231.3 |
| 2004/0145670 | A1   | 7/2004  | Hong |
| 2004/0201767 | A1   | 10/2004 | Niikawa et al. |
| 2005/0134719 | A1   | 6/2005  | Beck |
| 2005/0174457 | A1   | 8/2005  | Yoshino et al. |
| 2005/0212817 | A1 * | 9/2005  | Cannon et al. ................ 345/619 |
| 2006/0204057 | A1 * | 9/2006  | Steinberg ...................... 382/118 |

FOREIGN PATENT DOCUMENTS

| JP | 2003-125251 | 4/2003  |
| JP | 2005-303522 | 10/2005 |
| KR | 2006-108402 | 10/2006 |

* cited by examiner

*Primary Examiner* — Tuan Ho
*Assistant Examiner* — Yih-Sien Kao
(74) *Attorney, Agent, or Firm* — Cha & Reiter, LLC (57) ABSTRACT

A portable terminal and a method for displaying an image using focus information are disclosed. An interested area of the captured subject image can be rapidly displayed on the display. The captured subject image can be displayed on the display, according to the features of an interested area image. At least one interested area is extracted from the captured subject image. When one of the extracted interested areas is selected, image information of the captured subject, which includes focus information of the selected interested area, is generated. When requesting that the captured subject image is displayed, an interested area image of the captured subject image is displayed according to focus information of the generated image information.

23 Claims, 4 Drawing Sheets

MOBILE COMMUNICATION TERMINAL AND METHOD FOR DISPLAYING IMAGE USING FOCUS INFORMATION THEREOF

CLAIM OF PRIORITY

This application claims priority under 35 U.S.C.§119(a) from an application entitled "MOBILE COMMUNICATION TERMINAL AND METHOD FOR DISPLAYING IMAGE USING FOCUS INFORMATION THEREOF" filed in the Korean Intellectual Property Office on Mar. 30, 2007 and assigned Serial No. 2007-0031396, the contents of which are incorporated herein by reference in its entirety.

BACKGROUND OF THE INVENTION

1. Field of the Invention

The present invention relates to a portable terminal. More particularly, the present invention relates to a portable terminal that displays an image using focus information thereof, and a method that displays an image using the focus information of the portable terminal.

2. Description of the Related Art

With the development of mobile communication technology and portable terminal manufacturing technology, various types of portable terminals have been introduced with portability that is becoming increasingly more convenient. As the capabilities become more advanced in terms increased memory capacity and a variety of functions of portable terminals increase, such portable terminals can provide text information, image information, moving picture experts group layer 3 (MP3) data, and even multimedia functions, such as games, etc., to users.

The term "portable terminal" refers to wireless terminals, personal digital assistants (PDAs), portable multimedia players (PMPs), and digital cameras, etc. In particular, a portal terminal to which a camera module is mounted can now perform multi-media communication as well as a voice communications, in which the camera module can photograph subjects, and store and transmit the captured (i.e. shot) images.

The conventional portable terminal encodes typically stores images captured by the camera module in a Joint Photographic Expert Group (JPEG) format. Such encoded images are decoded and then displayed on a display screen.

However, since the captured image is displayed on the display as it is captured, a user must perform panning or a plurality of zooming stages for the displayed image to check whether a specific portion of the scene captured will be included the photo. For example, if a person is photographed with a landscape in the background, the person typically occupies a relatively small area of the image. Therefore, the user of the portable terminal must repeatedly operate volume keys for zooming, and four direction keys for panning to magnify the area of the person in the image, which is inconvenient to the user.

Also, since the conventional portable terminal displays an image on the display according to the shooting mode in which the photograph was made regardless of the features of the image, there is a limitation in displaying images that comply with the features of the displayed images. That is, it is preferable that an image of a person is displayed in the portrait format, and an image of a landscape is displayed in the landscape format. However, when an image of a person captured in the landscape mode is displayed, the conventional portable terminal displays the image of the person in the landscape format and does not display it to comply with the features of the portrait image. Similarly, when the image of the landscape taken in the portrait mode is displayed, the conventional portable terminal displays the image of the landscape in the portrait format and does not display it to comply with the features of the landscape image. In other words, the conventional portable terminal uses the mode in which a photo was made as a strict default.

SUMMARY OF THE INVENTION

The present invention has been made in part to solve at least some of the above-mentioned problems, and provide some of the advantages to be described herein below. The present invention provides a portable terminal that can rapidly display an interested area of an image and a method for displaying the image using focus information thereof.

One exemplary aspect of the invention provides a portable terminal that can display an interested area of an image in the portrait format or landscape format according to features of the interested area, and a method for displaying the image using focus information thereof.

In accordance with another exemplary aspect of the present invention, there is provided a portable terminal that displays an image with reference to a focus, using focus information of the image, and a method for displaying an image using the focus information.

In accordance with the aforementioned discussion, a method for displaying an image using focus information of a portable terminal includes: extracting at least one interested area from a captured image of a subject; and when at least one of the extracted interested areas is selected, generating image information of the captured subject, which includes at least one piece of focus information of the selected interested area.

Preferably, the method may further include displaying the interested area image of the captured subject image according to focus information of the generated image information, when requesting that the captured subject image is displayed.

In accordance with a second exemplary aspect of the present invention, there is provided a portable terminal that includes a camera module, a display, image extracting unit, and image information generating unit. The camera module captures in image of a subject. The display displays an image including the captured subject image. The image extracting unit extracts at least one interested area from the captured subject image. The image information generating unit generates image information of the captured subject, which includes at least one piece of focus information about one of the extracted interested areas, which is determined by selecting from the extracted interested areas.

Preferably, the terminal may further include an image controlling unit for displaying the interested area image of the captured subject image on the display, according to focus information of the generated image information, when requesting that the captured subject image is displayed.

BRIEF DESCRIPTION OF THE DRAWINGS

The above and other features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. A person of ordinary skill in the art should understand and appreciate that the drawings are presented for purposes of illustration and not for limiting the invention to the examples shown and described herein.

Portable Terminal

Figure 1:
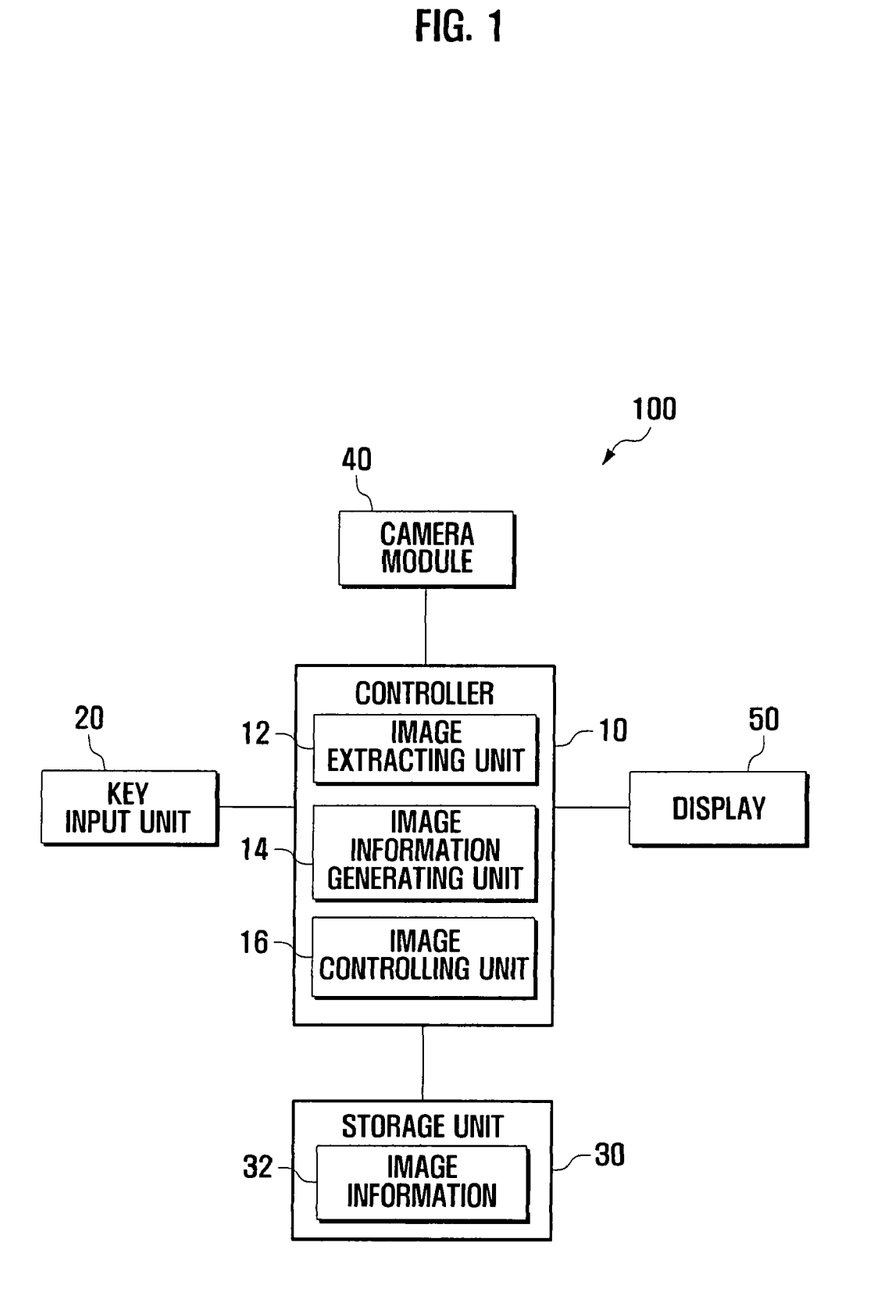
FIG. 1 is a schematic block diagram illustrating a portable terminal according to an exemplary embodiment of the present invention.

FIG. 1 is a schematic block diagram illustrating a portable terminal 100 according to an exemplary embodiment of the present invention.

Referring to FIG. 1, the portable terminal 100 is configured to include a controller 10, key input unit 20, storage unit 30, camera module 40, and display 50.

In this example, the controller 10 typically controls the entire operation of the portable terminal 10. In particular, the controller 10 controls an image displaying using focus information of captured subject image.

The key input unit 20 includes a plurality of keys for operating the portable terminal 10. The key input unit 20 generates key data as a user selects corresponding keys and transmits it to the controller 10. In particular, user's commands generated by the key input unit 20 include a shooting mode execution and an image display mode execution.

The storage unit 30 stores a program for controlling operations of the portable terminal 100, and data created while the program is executed. In particular, the storage unit 30 also stores, for example, another program for displaying images using focus information of a captured image, and data created while another program is executed. In addition, the storage unit 30 stores image information 32 about a captured subject.

The camera module 40 serves to photograph a subject, and is configured to include a lens and a charged coupled device (CCD) or a complementary metal oxide semiconductor (CMOS) image sensor. In particular, the camera module 40 photographs a subject and outputs image data thereof.

The display 50 displays an image of a preview state in the shooting mode, and an image of image information 32 stored in the storage unit 30 in the image display mode. The display 50 is implemented by a liquid crystal display (LCD).

In particular, the controller 10 includes an image extracting unit 12, image information generating unit 14, and image controlling unit 16. The image extracting unit 12 extracts at least one interested area of a captured subject image. When one of the extracted interested areas is selected, the image information generating unit 14 generates image information 32 of the captured subject, which includes focus information of the selected interested area. When the captured subject image is requested to be displayed, the image controlling unit 16 displays an interested area image in the captured subject image, according to the focus information of the generated image information 32, on the display 50. Here, the selected interested area includes at least one or more pieces of focus information.

The following is a description of exemplary operations and functions of the image extracting unit 12, image information generating unit 14, and image controlling unit 16, which are related to image display using focus information.

In general, in the case where a captured image includes other subjects in addition to the principal, the image extracting unit 12 extracts the portion of the principal subject as an interested area from the captured image. For example, the interested area may be a face in the captured image. Also, the interested area may be a subject marked on a focus area with reference to the focus of a camera.

When the camera module 40 has a multifocal lens, the image extracting unit 12 may also extract a plurality of interested areas from the captured image. In addition, the image extracting unit 12 presents the extracted interested areas according to the focus values in order, so that a user can select at least one of them. Here, the image extracting unit 12 requests selection for the sequentially presented interested areas from the user through the display 50.

The captured subject image information 32 includes image data and exchangeable image file format (EXIF). The image data may include a JPEG format. The EXIF includes detailed additional information of an image, such as the manufacturer and model of a portable terminal 100, image editor, image correction date, EXIF version, captured date, actual size of an image uploaded on the web, exposure time, shooting program, focal length, aperture size of an iris diaphragm, and a status indicating whether a flash was used, etc. In particular, the image information generating unit 14 typically includes focus information of an interested area with the EXIF to generate captured subject image information 32. In addition, the image information generating unit 14 may include focus information of an interested area with a thumbnail to generate captured subject image information 32.

The image extracting unit 12 extracts an interested area from a captured subject image, using at least one piece of focus information. Here, the focus information can be detected by hardware, such as a camera module 40 having a multifocal lens and an image processing unit, or by software, such as a dedicated application program, and/or a combination of the two.

For example, when a portable terminal 100 includes a camera module 40 having a multifocal lens and an image processing unit, it includes focus information with a thumbnail or EXIF, based on pixel unit or macro block unit, and then stores it.

According to an exemplary aspect of the present invention, the dedicated application program can be implemented based on an edge detection algorithm. In other words, before photographing an image, at least one area to which the edge detection algorithm is intended to process is set in a shooting area that the camera module 40 is intended to photograph, in a shooting setting mode. The image extracting unit 12 applies the edge detection algorithm to the set area in the captured subject image to detect focus information. Here, the detected focus information is included in a thumbnail or EXIF to be stored.

Still referring to FIG. 1, the image extracting unit 12 extracts an area including detected focus as an interested area. According to an exemplary aspect of the invention, the image extracting unit 12 may extract an interested area proportional to the size of the display 50. Therefore, the extracted interested area is optimized in the size of the display 50 and thus magnified when displayed on the display 50.

The image controlling unit 16 (shown in FIG. 1) encodes image information of the captured subject image in the JPEG format. The image controlling unit 16 includes a codec for processing the encoded image information 32. Here, the image controlling unit 16 stores the image information 32 in the storage unit 30, generally the encoded image information.

When receiving a request that the captured subject image is displayed, the image controlling unit 16 extracts image information 32 of the requested captured subject image from the storage unit 30. In addition, the image controlling unit 16 further decodes the extracted image information 32 if it was encoded. The image controlling unit 16 displays an interested area image, according to focus information of the extracted image information 32, on the display 50.

Also, when receiving a request that the captured subject image is displayed, the image controlling unit 16 extracts image information 32 of the requested captured subject image from the storage unit 30. The image controlling unit 16 displays an interested area image of the image information 32, which is extracted according to focus information, on the display 50. When the extracted image information 32 is encoded, the image controlling unit 16 decodes an interested area image of the extracted encoded image information 32 and then displays it on the display 50.

For example, when an interested area image is a person, the image extracting unit 12 detects the position of the eyes and the mouth using the edge detection algorithm that can read the outline of a person, and calculates relative distances between the detected the eyes and mouth to detect the size of the face. The image extracting unit 12 extracts an area including the detected focus as an interested area. The image controlling unit 16 magnifies the image of the extracted interested area to be optimized in the size of the display 50 using the detected information and then display it on the display 50.

Meanwhile, the image extracting unit 12 may employ face recognition methods, such as an Eigenfaces Method using principle component analysis (PCA), a Fisherfaces Method using Fisher Liner discriminant (FLD), and a method using the PCA and Support Vector Machine (SVM), all of which are known by a person or ordinary skill in the art.

Still referring to FIG. 1, the image controlling unit 16 displays an interested area image in a portrait or landscape on the display 50, according to the features of an interested area. The image controlling unit 16 adjusts the size of the interested area image to comply with proportions of the display 50 and then displays the interested area on the display 50.

For example, when the interested area image is a person, it is displayed in portrait. Also, when the interested area image is a landscape, it is displayed in landscape. In addition, since the interested area is a part of the captured subject image, the image controlling unit 16 magnifies the interested area image and then displays the interested area on the display 50.

According to another exemplary aspect of the present invention, the image controlling unit 16 may edit the interested area image based on a preset edit format, according to focus information, and then displays the edited interested area image on the display 50. For example, the image controlling unit 16 highlights the peripheral portion except for the focused portion of the interested area, according to focus information, and then displays the image to comply with the size of the display 50. Also, the image controlling unit 16 displays the interested area image in a frame form.

Therefore, the portable terminal 100 according to the present invention can magnify an interested area of the captured subject image, using focus information, and then display the magnified interested area on the display 50, so that a user can see the interested area image while the user operates the volume keys and four direction keys of the portable terminal relatively less often. In addition, the portable terminal 100 displays the interested area image in a portrait format or a landscape format, according to the features of the interested area.

Method for Displaying an Image

The following is a detailed description of exemplary embodiments of a method for displaying an image of the portable terminal 100 according to the present invention, which is present to illustrate some examples of configurations and operations of the portable terminal 100 according to the present invention in operation.

One example of the method for displaying an image performed in a shooting mode will be described in detail with reference to FIGS. 1 and 2. Here, FIG. 2 is a flow chart illustrating a method for displaying an image using focus information of a portable terminal 100 according to an exemplary embodiment of the present invention, particularly in a shooting mode.

First, when a shooting mode is selected, as a user selects a key through the key input unit 20, the controller 10 executes the shooting mode (S61). Specifically, when the user selects a key linked to an executing function of the shooting mode or selects the shooting mode through a main menu, the controller 10 executes the shooting mode.

Figure 2:
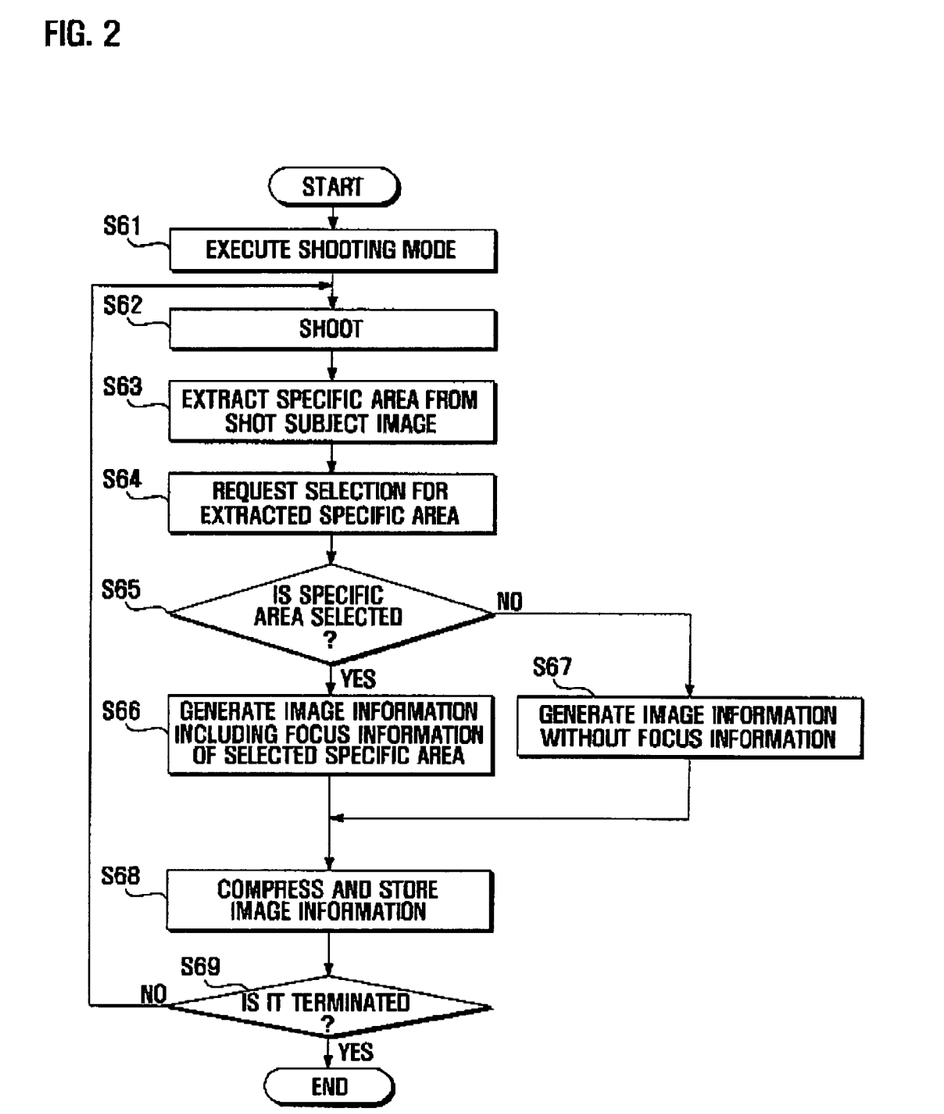
FIG. 2 is a flow chart illustrating the steps of a method for displaying image using focus information of a portable terminal according to an exemplary embodiment of the present invention, particularly in a shooting mode.

Still referring to FIG. 2, at step 62, when a key corresponding to a shutter is selected, the camera module 40 shoots (captures) an image of a subject under the control of the controller 10. Here, the user can see the subject, intended to be captured, through a preview image of the display 50, or by a view finder.

At step 63, the image extracting unit 12 extracts an interested area from the captured subject image. In other words, if the subject image includes at least one or more subjects, the image extracting unit 12 extracts a portion of a principal subject, as an interested area, from the captured subject image.

At step 64, the image extracting unit 12 requests that the user select the extracted interested area through the display 50. Specifically, the image extracting unit 12 presents the extracted interested areas on the display 50, according to focus values of the extracted interested areas, in order, such that the user can select one of them.

At step 65, the image information generating unit 14 determines whether one of the extracted interested areas has been selected. Here, selecting one of the extracted interested areas is performed by user's key selection.

When one of the extracted interested areas is selected in step 65, the image information generating unit 14 generates image information 32 including focus information of the selected interested area (S66). That is to say, the image information generating unit 14 includes the focus information of the interested area with an EXIF to generate the image information 32 of the captured subject image.

On the contrary, in the case where the extracted interested area is not selected in step 65, and the image information generating unit 14 generates image information 32 of the captured subject image, in which focus information is not included (S67). Here, the generated image information 32 is identical to the conventional image information. After step 67, the image controlling unit 16 encodes the generated image information 32 in JPEG format and then stores the image information in the storage unit 30 (S68).

Subsequently, the controller 10 then determines whether or not the shooting mode has terminated (S69). When determining that the shooting mode has not terminated in S69, the controller 10 repeats S62 to S68. The subject shooting procedures are repeatedly performed until the shooting mode has terminated.

Figure 3:
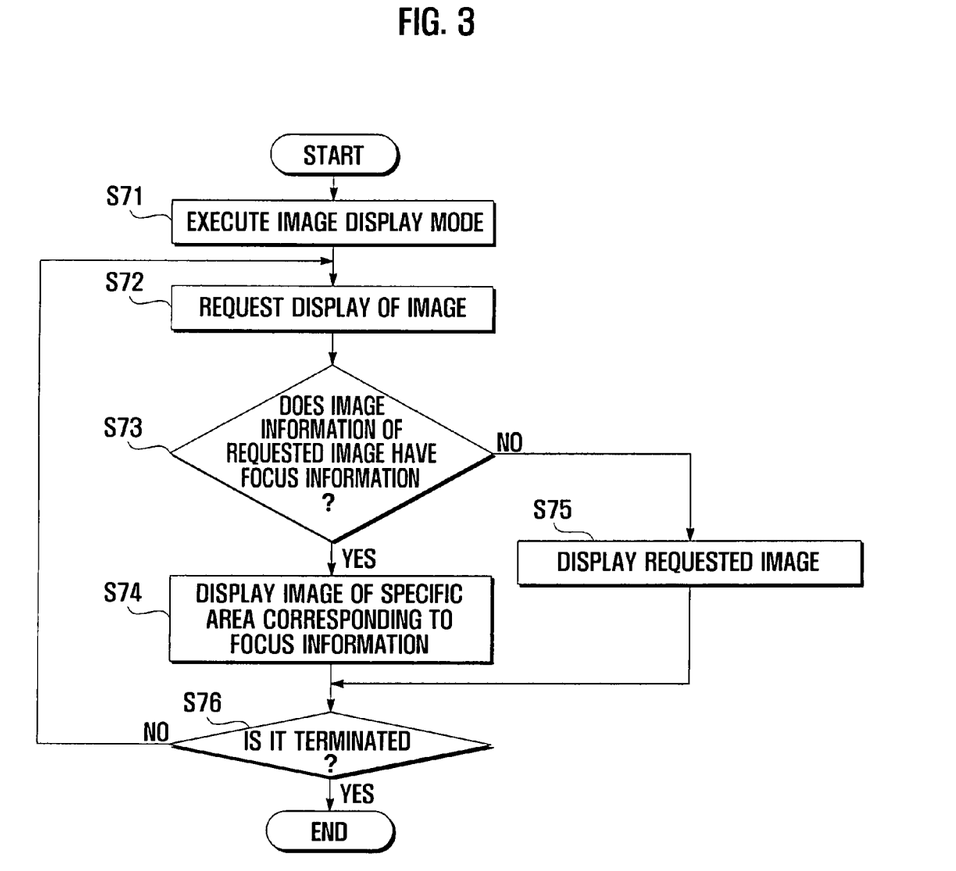
FIG. 3 is a flow chart illustrating the steps of a method for displaying an image using focus information of a portable terminal according to an exemplary embodiment of the present invention, particularly in an image display mode.

Now with reference to FIGS. 1 and 3, an example of the method for displaying an image performed in an image display mode will be described in detail. FIG. 3 is a flow chart illustrating a method for displaying an image using focus information of a portable terminal 100 according to an exemplary embodiment of the present invention, particularly in an image display mode.

First, when an image display mode is selected by a user, who selects a key though the key input unit 20, the controller 10 executes the image display mode (S71). Specifically, when the user selects a key linked to an executing function of the image display mode or selects the image display mode through a main menu, the controller 10 executes the image display mode.

The controller 16 is requested to display the captured image as the user selects a key through the key input unit 20 (S72).

The controller 16 then determines whether or not image information 32 of the request image has focus information (S73).

When the image information 32 has focus information from the determination of S73, the image controlling unit 16 displays an interested area image corresponding to the focus information on the display 50 (S74). Here, the image information 32 refers to the image information 32 that was generated through S65 and then encoded and stored through S67. Since the interested area image is a portion of the captured subject image, the image controlling unit 16 magnifies the interested area image and then displays the magnified area image on the display 50. In other words, the user can check the desired interested area in the captured image, although the user barely uses the volume keys and four direction keys to perform panning or zooming of the displayed image.

Still referring to FIG. 3, when the image information 32 does not have focus information from the determination of S73, the image controlling unit 16 displays the requested image on the display 50 (S75) with any focus information or image information. Here, the image information 32 refers to the image information 32 that was generated at S66 (FIG. 2), and then encoded and stored at S68. That is, the image controlling unit 16 displays the captured image on the display 50 in the conventional format at step S75.

Subsequently, at step 76 the controller 10 determines whether or not the image display mode has terminated (S76). When the controller 10 determines that the image display mode is not terminated at S76, the controller 10 repeats S72 to S74. The image display procedures are performed repeatedly until the image display mode is terminated.

Meanwhile, at least one advantage of the present invention can be easily confirmed is that the display of an image on the portable terminal based on the display method using focus information, requires fewer keystrokes to display an interested area, as compared with the conventional image display method that does not use focus information. Such an effect will be described with reference to FIGS. 4A to 4D. FIGS. 4A to 4D show examples of the output on display screens according to the method for displaying an image using focus information of a portable terminal according to an exemplary embodiment of the present invention. Here, the portable terminal 100 includes a display 50 of an image in portrait style.

Figure 4:
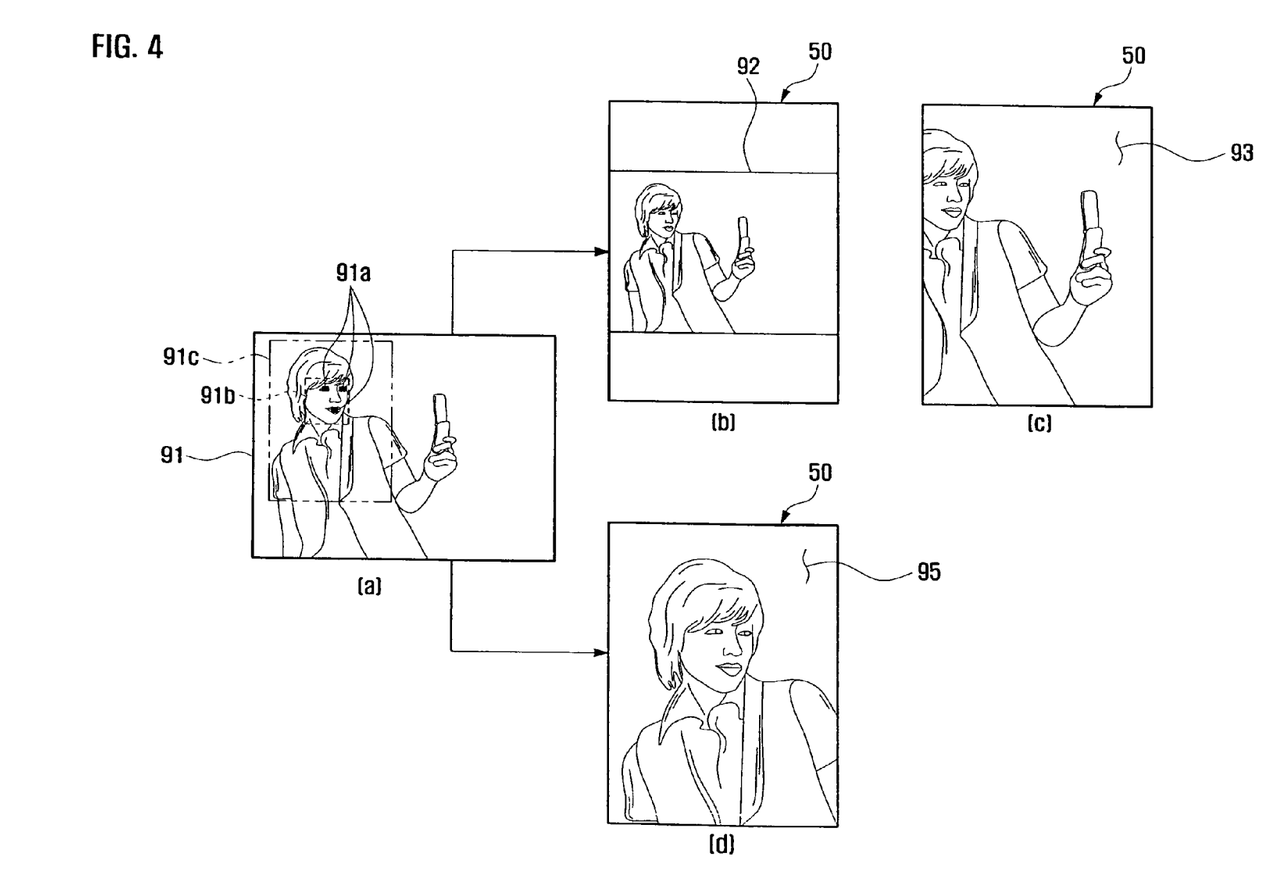
FIG. 4 shows display screens according to the method for displaying an image using focus information of a portable terminal according to an exemplary embodiment of the present invention.

FIG. 4A shows a screen displaying an original image of a captured subject image 91. The subject image 91 captured in the camera module 40 of the portable terminal 100 has a landscape format. A person as a subject is positioned at the left of the captured image 91. Since the subject of the captured subject image 91 is a person, the image extracting unit 12 extracts an interested area 91c including the face from the captured subject image 91. Here, focus position 91a of the interested area 91c may be the eyes and mouth of the subject. Moreover, focus area 91.b of the interested area 91c may also comprise the face.

When the user requests display of the image shown in FIG. 4A, and image information 32 of the requested image does not have focus information, the image controlling unit 16 displays the captured subject image 91 as it is on the display 50, as shown in FIG. 4B or 4C, similar to the conventional image display method. In other words, referring to FIGS. 4A and 4B, the image controlling unit 16 reduces the captured subject image 91 while maintaining its ratio and displays the captured subject image on the display 50 in a landscape format. Here, the reference numeral 92 denotes an image displayed on the display 50.

Also, as shown in FIGS. 4A and 4C, the image controlling unit 16 displays the captured subject image 91 in a portrait format. Since the captured subject image 91 has a landscape format, a part of the left or right thereof is not displayed on the screen. Therefore, the user must operate the volume keys or four direction keys to magnify the person in the image 93 displayed on the display 50. It should be understood that there can be different keys used to magnify or position the image viewed on the display 50.

However, when the user requests the display of an image of FIG. 4A, and image information 32 of the requested image 91 has focus information 91a, the image controlling unit 16 magnifies an interested area 91d of the captured subject image 91 using the focus information 91a and displays it on the display 50. Here, since the interested area image 91c is a person, the image controlling unit 16 magnifies the interested area image 91c in portrait format and then displays the image in the form of a close-up on the display 50. That is, according to the present invention, the image display method using focus information 91a can reduce the use of the volume keys and four direction keys to check a person in the captured subject image 95 displayed on the display 50 screen.

As described in the foregoing, according to the present invention, a method for image display and the portable terminal can magnify an interested area of the captured subject image using focus information thereof, and then display the magnified on the display, resulting in a decrease in the use of the volume keys and four direction keys to check the interested area, as compared with a conventional camera module of a mobile communication terminal.

Accordingly, since the captured subject image can be displayed in a portrait or a landscape display according to the features a specific area image thereof, so that a user can easily check the images displayed on the portable terminal.

Various substitutions or modifications to the exemplary embodiments shown and described herein above may be made by a person of ordinary skill in the art that would not depart from the spirit of the invention and the scope of the appended claims. For example, the modes of the camera, type of input unit, display type, modes of image extraction, etc. may all be in forms that are modified from or contain substitutions to the examples disclosed herein above. While JPEG is disclosed as an exemplary encoding format, a person or ordinary skill in the art understands and appreciates than any known format may also be used.

What is claimed is:

1. A method for displaying an image using focus information of a portable terminal, comprising:
   (a) extracting at least one interested area from a captured subject image; and
   (b) generating image information of the captured subject;

(c) displaying the selected interested area of the captured subject image according to focus information of the generated image information;

wherein when the extracted at least one interested area is selected, the generated image information generated by the generating step (b) includes focus information, so that the selected interested area is magnified automatically in order to reduce an amount of panning or zooming for display thereof at the magnified size, wherein displaying the interested area image comprises:

automatically determining on a basis of features of the interested area image as to whether the interested area image is to be displayed in a portrait or landscape format; and magnifying the interested area image for display in the portrait or landscape format according to features of the interested area image;

wherein an image controlling unit of the portable terminal automatically corrects a position of the magnified interested area image displayed on the portable terminal by using focus information to display only the magnified interested area image of the captured image on the display without cutting off any portion of the magnified interested area or having a border around at least a portion of the magnified interested area image.

2. The method of claim 1, further comprising displaying the selected interested area of the captured subject image in step (c) in response to receiving a request to display the captured subject image.

3. The method of claim 1, further comprising:
displaying the selected interested area of the captured subject image in step (c) in response to a receiving a request to display the extracted interested area.

4. The method of claim 3, wherein the request to display the extracted interested area in step (c) is automatically generated from a program in a controller of the portable terminal according to a mode of the portable terminal.

5. The method of claim 4, wherein the selected interested area comprises a face of a person included in the captured subject image.

6. The method of claim 1, further comprising:
(c) encoding image information of the captured subject generated in step (b); and storing said encoded image information in a storage unit.

7. The method according to claim 6, wherein the image information is encoded in step (c) in a Joint Photographic Expert Group (JPEG) format.

8. The method according to claim 1, further comprising (d) encoding image information of the captured subject in a Joint Photographic Expert Group (JPEG) format; and storing said encoded image information in a storage unit.

9. The method of claim 1, wherein the image information of the captured subject comprises image data, and exchangeable image file format (EXIF), and wherein the image information of the captured subject includes the focus information with the EXIF.

10. The method of claim 7, wherein the image information of the captured subject comprises image data, and exchangeable image file format (EXIF), wherein the image information of the captured subject includes the focus information with the EXIF.

11. The method of claim 8, wherein the image information of the captured subject comprises image data, and exchangeable image file format (EXIF), wherein the image information of the captured subject includes the focus information with the EXIF.

12. The method of claim 7, wherein the method further comprises:
decoding the encoded subject image corresponding to the requested captured subject image; and
displaying an image of the selected interested area of the decoded subject image, according to the focus information.

13. The method of claim 10, wherein displaying the selected interested area of the captured subject image comprises:
decoding an image of the interested area in the encoded subject image corresponding to the requested captured subject image; and
displaying the decoded image of the selected interested area.

14. The method of claim 1, wherein displaying the selected interested area of the captured subject image comprises:
highlighting peripheral portions except for a focused portion of the selected interested area according to the focus information, and magnifying the image of the selected interested area for display.

15. The method of claim 1, wherein displaying the selected interested area of the captured subject image comprises:
editing the image of the selected interested area in a set edit mode according to the focus information for display.

16. A portable terminal comprising:
a camera module for capturing an image of a subject;
a display for displaying an image including the captured subject image;
an image extracting unit for extracting at least one interested area from the captured subject image;
an image information generating unit for generating image information of the captured subject; and
an image controlling unit for displaying the interested area image of the captured subject image on the display, according to focus information of the generated image information, when requesting that the captured subject image is displayed,
wherein the at least one interested area is extracted by the image extracting unit, the image information generated by the image information generating unit includes focus information of interested area selected by the portable terminal from among the extracted interested areas, so that the selected interested area is magnified automatically based on the focus information in order to reduce an amount of panning or zooming for display thereof at the magnified size, wherein the image controlling unit:
determines on a basis of features of the selected interested area as to whether the selected interested area image is to be displayed in a portrait or landscape format; and
displays the interested area image to comply with a size of the display in a portrait or a landscape format, according to features of the interested area image; and
wherein the image controlling unit automatically corrects a position of the magnified interested area image displayed on the portable terminal by using focus information to display only the magnified interested area of the captured image without cutting off any portion of the magnified interested area or having a border around at least a portion of the magnified interested area image.

17. The portable terminal of claim 16, wherein the selected interested area is a face of a person included in the captured subject image.

18. The portable terminal of claim 16, wherein:
the image controlling unit comprises a codec for encoding image information of the captured subject in Joint Photographic Expert Group (JPEG) format and decoding the encoded image information; and the portable terminal further comprises a storage unit for storing the encoded image information.

19. The portable terminal of claim 18, wherein:
the captured subject image information comprises image data and EXIF; and
the image information generation unit includes the focus information with the EXIF.

20. The portable terminal of claim 19, wherein the image controlling unit extracts the encoded subject image information corresponding to the captured subject image, which is requested, from the storage unit, decodes the extracted result, and displays the image of the selected interested area of the decoded subject image information on the display, according to the focus information.

21. The portable terminal of claim 19, wherein the image controlling unit extracts the encoded subject image information corresponding to the captured subject image, which is requested from the storage unit, decodes an image of the interested area of the encoded subject image information according to the focus information, and displays the decoded image of the interested area on the display.

22. The portable terminal of claim 16, wherein the image controlling unit highlights peripheral portions except for a focused portion of the selected interested area, according to the focus information, and displays the image of the selected interested area to comply with a size of the display.

23. The portable terminal of claim 16, wherein the image controlling unit edits the image of the selected interested area in an edit mode, according to the focus information, and displays it.

* * * * *